United States Patent
Foucher et al.

(10) Patent No.: US 8,175,818 B2
(45) Date of Patent: May 8, 2012

(54) DEVICE AND METHOD OF MONITORING AN ENVIRONMENTAL PARAMETER IN REAL TIME

(75) Inventors: Bruno Foucher, Chatillon (FR); Vincent Rouet, Orgeval (FR)

(73) Assignee: European Aeronautic Defence and Space Company EADS France et EADS CCR, Paris (FR)

(*) Notice: Subject to any disclaimer, the term of this patent is extended or adjusted under 35 U.S.C. 154(b) by 774 days.

(21) Appl. No.: 12/162,776

(22) PCT Filed: Jan. 23, 2007

(86) PCT No.: PCT/FR2007/050676
§ 371 (c)(1),
(2), (4) Date: Oct. 18, 2008

(87) PCT Pub. No.: WO2007/085756
PCT Pub. Date: Aug. 2, 2007

(65) Prior Publication Data
US 2009/0306908 A1    Dec. 10, 2009

(30) Foreign Application Priority Data
Jan. 30, 2006    (FR) .................................. 06 50326

(51) Int. Cl.
*G01B 3/44*    (2006.01)

(52) U.S. Cl. ........................................................ 702/34
(58) Field of Classification Search .................. 702/34, 702/184
See application file for complete search history.

(56) References Cited

U.S. PATENT DOCUMENTS

| | | | |
|---|---|---|---|
| 4,336,595 A * | 6/1982 | Adams et al. | 702/34 |
| 5,600,576 A | 2/1997 | Broadwater et al. | |
| 5,867,809 A * | 2/1999 | Soga et al. | 702/130 |
| 2003/0153997 A1* | 8/2003 | Samata et al. | 700/108 |

FOREIGN PATENT DOCUMENTS

| | | |
|---|---|---|
| DE | 10154482 | 5/2003 |
| DE | 10255288 | 7/2004 |
| FR | 2 844 902 | 3/2004 |

* cited by examiner

*Primary Examiner* — Drew A Dunn
*Assistant Examiner* — Stephen Cherry
(74) *Attorney, Agent, or Firm* — Patterson Thuente Christensen Pedersen, P.A.

(57) ABSTRACT

A monitoring device of environmental parameter values of an environment surrounding a system. The device includes a sensor to these parameters, and includes a capability to transmit, in real time, each measurement to a processing unit. The processing unit is installed in the system and includes a capability to filter the transmitted measurements. This processing unit comprises a capability to determine cycles from the measurements thus simplified as well as a capability to calculate, in real time, of a percentage of length of consumed life of the system, from the thus determined cycles.

11 Claims, 4 Drawing Sheets

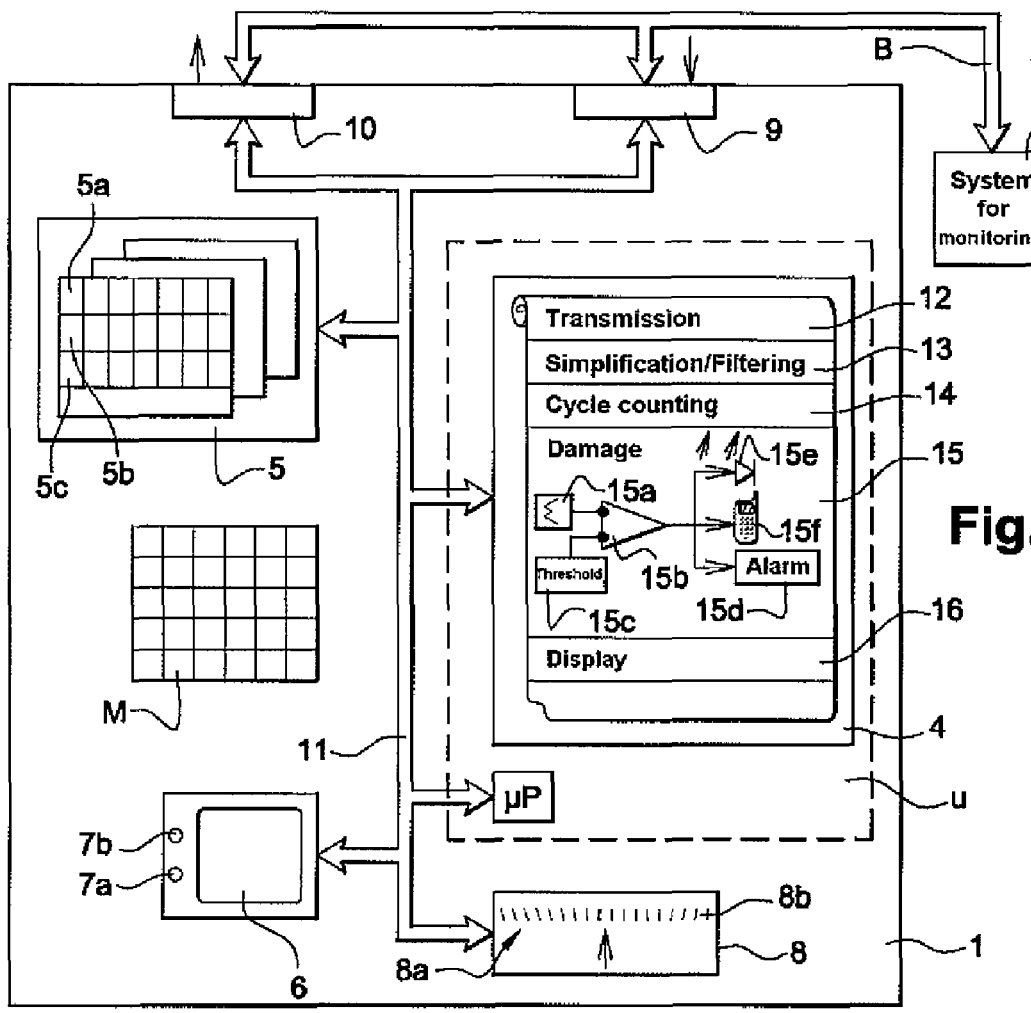
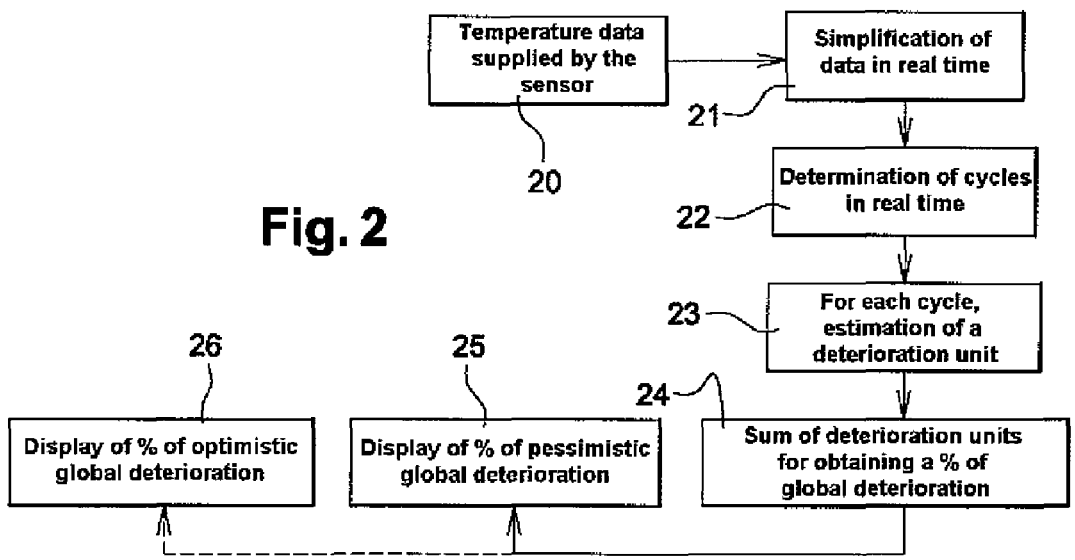

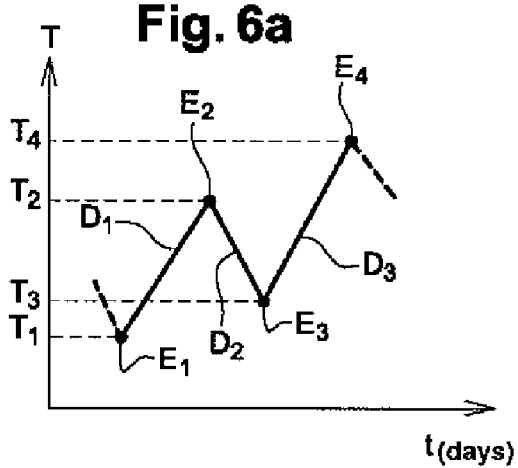
Fig. 6a
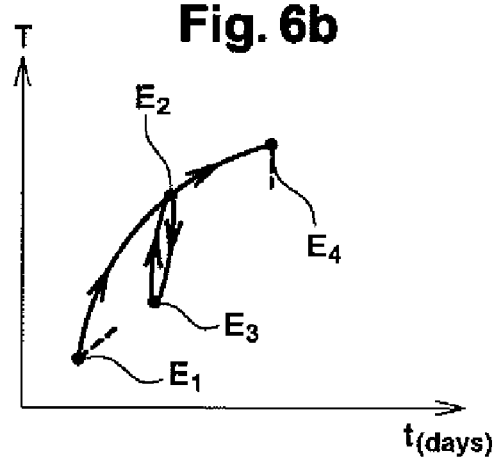
Fig. 6b
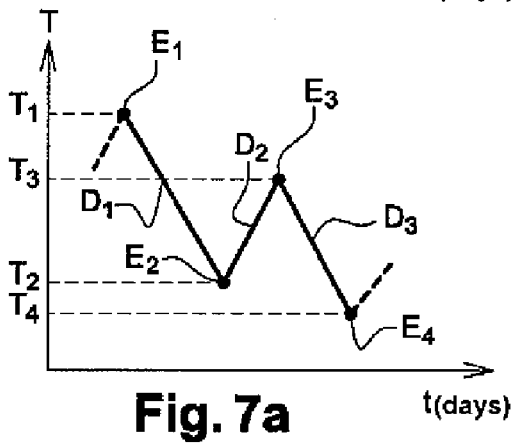
Fig. 7a
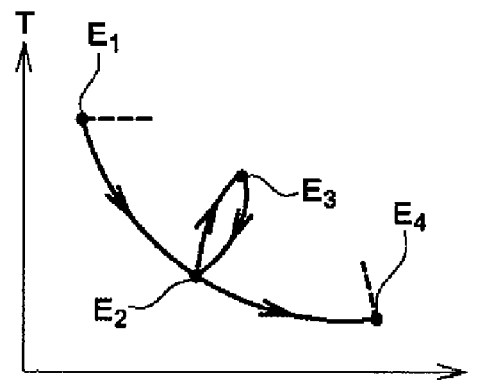
Fig. 7b
| $T_{moy}$ \ $\Delta T$ | 30°C | 45°C | 60°C | 75°C | 90°C | 105°C | 120°C | 135°C | 150°C | 165°C | 180°C |
|---|---|---|---|---|---|---|---|---|---|---|---|
| -30°C | 65535 | 39968 | 16612 | 9819 | 5850 | 3906 | 2713 | 1967 | 1475 | 1138 | 898 |
| -15°C | 65535 | 31763 | 13907 | 7906 | 4842 | 3201 | 2236 | 1633 | 1232 | 555 | 757 |
| 0°C | 65535 | 25190 | 11250 | 6023 | 3760 | 2511 | 1775 | 1307 | 955 | 777 | 621 |
| 15°C | 49567 | 17630 | 9037 | 5102 | 3194 | 2146 | 1524 | 1126 | 860 | 674 | 540 |
| 30°C | 40401 | 14723 | 6753 | 3994 | 2538 | 1725 | 1237 | 922 | 710 | 560 | 452 |
| 45°C | 29554 | 10830 | 5545 | 3152 | 2027 | 1396 | 1011 | 760 | 590 | 469 | 380 |
| 60°C | 22776 | 8687 | 4380 | 2365 | 1562 | 1094 | 804 | 612 | 480 | 385 | 315 |
| 75°C | 15086 | 5724 | 3299 | 1844 | 1243 | 884 | 657 | 506 | 401 | 324 | 267 |
| 90°C | 14345 | 5694 | 2972 | 1792 | 1186 | 837 | 619 | 474 | 374 | 302 | 248 |
| 105°C | 10254 | 4192 | 2300 | 1389 | 940 | 675 | 505 | 393 | 312 | 254 | 210 |
| 120°C | 9381 | 3889 | 2076 | 1278 | 861 | 616 | 461 | 358 | 285 | 232 | 192 |
Fig. 8

DEVICE AND METHOD OF MONITORING AN ENVIRONMENTAL PARAMETER IN REAL TIME

FIELD OF THE INVENTION

The object of the present invention is a device and a method of monitoring and measuring in real time an environmental parameter of a system. The present invention can be applied particularly advantageously, but not exclusively, in the domains of aeronautics, nuclear, naval, automobile petrochemical, and others.

An aim of the invention is to optimize the maintenance of a system under surveillance by determining in real time the failure, or expected failure, of said system.

Another aim of the invention is to install the monitoring device in the system which is to be monitored.

The invention is also aimed at determining in real time the length of consumed life of the system under surveillance.

BACKGROUND OF THE INVENTION

Currently, the diagnosis of a system under surveillance, which can be an electronics card, is done by an environmental measurement recording device. One such device is known under the English name "Time Stress Measurement Device, TMSD". Such a device is described in the document FR-A1-2 844 902. This device comprises two sub-devices. The first portion is installed in the system to be monitored. And, the second portion is situated outside of the system to be monitored.

The first portion measures over time the environmental or factual parameters of the system to be monitored, such as the temperature, humidity, vibrations, shock, and so on. The first portion comprises a memory permitting the recording of measurements. After obtaining a complete profile of the recorded measurements, which can take several days, these recorded measurements are transferred in digital form to the second portion, which is a processing unit. The second portion analyzes the measurements recorded by the first portion in order to supply a system diagnosis. In effect, the processing unit extracts information from the group of these recorded measurements concerning the length of consumed life of the system to be monitored, of which the failure modes and their impacts are previously known. With this type of device, the use of recorded measurements is outside of the first group.

However, such a device for recording environmental parameters presents some disadvantages. In effect, with this type of device, it is necessary to initially obtain a complete profile of the measurements which are measured and recorded before the processing unit can determine the failures of the system to be monitored. This complete profile necessitates a pre-determined and necessary amount of data for analysis by the processing unit.

In one example, when the system to be monitored is an electronics card on board an airplane, the recorded data are not retrieved and analyzed by the processing unit until a complete profile is obtained. For example, a complete profile may be obtained after fifteen return trips by the airplane. Thus an important time lapse is observed before the recorded data are transferred to the processing unit. The results supplied by the processing unit are not immediate. In effect, the quantity of data to be analyzed is such that it takes several days before a percentage of length of consumed life of the system to be monitored is obtained. In consequence, this result concerning failures of the electronics card under surveillance is no longer appropriate when it is obtained. During the days which are required by the processing unit to produce a result, the electronics card may become faulty, without this fault being detected.

Currently, a faulty electronics card will not be detected or replaced before the complete profile analysis has been obtained. Therefore, the airplane with this type of device has the time to make, at least one trip with a defective part before the processing unit has provided the results enabling its detection. The non-replacement of a faulty part in time can have repercussions of important consequence in the domains of aeronautics, naval, automobile, and others.

Also, with this type of device, the data flow for obtaining the complete profile is very important. Because of this, the processing unit comprises very complex algorithms designed to process these exported data. One such processing unit comprises a standard data-simplification algorithm known under the English name "Ordered Overall Range, OOR". This processing unit also comprises a standard cycle-counting algorithm, known under the English name "Rainflow". With these algorithms, it is imperative to have the necessary group of data to obtain a complete profile, for functioning.

With this type of algorithm, the calculation resource requirements, as well as the memory resource requirements, are relatively large. Creation of such a device thus requires the implementation of complicated technologies due to demanding specifications. This complicated technology increases the global cost of the device.

Moreover, the existing algorithms of the processing unit of this known device cannot be used in an installed environment. Because they are so complicated, they cannot cope with the constraints of the limited resources of an installed environment, such as the low rate of calculation, the limited speed and the low memory capacity. These algorithms are also useless in an installed environment because of the need to wait for a complete profile before being able to apply them. They can therefore not be applied to each new measurement in order to make real time management possible.

SUMMARY OF THE INVENTION

One aim of the invention is to provide a solution to the previously described technical disadvantages. To do this, in one embodiment, the invention proposes a device and method of monitoring an environmental parameter in real time. The invention's device comprises an onboard intelligence for running a health check on the system to be monitored in real time, thus optimizing the maintenance of the system. To do this, the invention has developed a new recording device of which the first measuring and recording portion and the second analysing portion are both installed in the system under surveillance. Further, the invention has developed new algorithms which take into account the constraints linked to limited resources of an installed environment such as the low rate of calculation, the limited speed and the low memory capacity.

The invention's algorithms make it possible to arrive at a result which is on par with those of known algorithms, for a same series of data, and this for almost no cost. They can be used in real time and require very little of a microcontroller's resources and at a low calculation rate. The present invention thus provides a solution to these complicated technological problems.

The invention comprises three different algorithms applied to each new measurement. The first algorithm is able to simplify the measured data, the second algorithm is able to count cycles based on the simplified data and the third algorithm is able to define the length, or percent age or fraction of length, of consumed life of the system based on each counted cycle, wherein the fault modes and their impacts are previously known.

With the invention, each new measurement taken is automatically processed. This permits an automatic update of system failure results.

Also, the invention's device is a device which is not dedicated to a single application. It can be easily adapted to any type of application. It can be used in many applications having very different environmental constraints.

More precisely, the object of the invention is a monitoring device of environmental parameter values or measurements of an environment surrounding a system comprising:
- a sensor to take the values or measurements of these parameters,
- a circuit for transmitting these measurements,
  - a processing unit comprising a microprocessor and a program memory for receiving these measurements, and processing these measurements in order to determine a length of consumed life of the system, this length of consumed life being the result of the environment to which the system is subjected, characterized in that it comprises:
- the means for transmission, in real time, of each measurement to the processing unit, and in that
- the processing unit is installed, and comprises the means of simplifying the transmitted measurements,
- the means for determining or identifying cycles based on the thus simplified measurements, and
- the means for calculating, in real time, the length of consumed life of a system, from the thus determined, or identified, cycles.

According to other embodiments, the device according to the invention may comprise one or more of the following additional characteristics:
- the means for simplifying, comprising the means for filtering the transmitted measurements in order to detect the extreme points;
- the processing unit comprises a three buffer memory;
- the sensor is a temperature sensor;
- the sensor is an accelerometer;
- the sensor is a constraint gauge.
- the processing unit comprises, in the means of calculation:
- a preconfigured memory for converting the determined cycles to deterioration value.
- the means for adding up deterioration values, and
- the means for warning or interpreting or alarming according to the obtained total;
- the preconfigured memory is composed of lines wherein their addresses represent average values of the cycle, and columns, wherein their addresses represent a differences in extreme values forming the cycle, the intersection of the lines and the columns supplying a number of faulty cycles, convertible to deterioration values which are opposite to the number of faulty cycles.
- the device comprises means for display permitting the visualisation on a screen of a total of deterioration values.

The invention also relates to an operating process of a monitoring device of values of an environmental parameter of an environment surrounding a system in which,
- measurements are taken of these values,
- these measurements are transmitted to a processing unit,
- these transmitted measurements are processed in order to determine a length of consumed life of the system, this length of consumed life being the result of the surrounding conditions to which the system is subjected, characterized in that the process comprises the following steps:
- each measurements is transmitted in real time to the processing unit,
  - only temporarily local extreme points, maximum or minimum, are detected amongst the transmitted measurements,
  - for each local extreme point thus detected, a cycle is sought, a cycle being formed by a succession of measurements from a minimum to a maximum, or the reverse,
- each detected cycle is converted into a deterioration value,
- the deterioration values are added up to determine the length, or fraction of length, of consumed life of the system.

According to other embodiments, a method according to the invention comprises the following additional characteristics:
- to detect a local extreme point:
  - a new measurement is acquired,
    - two preceding acquired measurements prior to this latest measure are considered, as well as one previously identified measurements, being an extreme point,
  - an average, called previous, of the two preceding measurements is calculated,
  - an average, called new, of the two latest acquired measurements is calculated,
    - a slope, called preceding, is calculated corresponding with the difference between the average of the previous measurements and the oldest preceding measurements and the average of the two preceding measurements,
    - a slope, called new, is calculated corresponding with the difference in the preceding average and the new average,
  - a maximum extreme point is produced, when the sign of the preceding slope is negative and the sign of the new slope is positive,
    - otherwise, a minimum extreme point is produced,
      - this produced extreme point is validated, when the difference between this produced extreme point and the preceding extreme point is greater than a given value of the environmental parameter to be monitored,
    - otherwise, the produced extreme point is temporarily recorded to serve as a previous extreme point in a comparison with a next extreme point.
- it is defined that a half-cycle is formed by two consecutive validated extreme points,
- when at least two half-cycles are stored in the buffer memories, and that
- the difference between the extreme points constituting a latest half-cycle is greater than the difference between the extreme points constituting a precedent half-cycle,
- thus the precedent half-cycle is counted as being a cycle,
- this counted cycle is deleted from the half-cycles,
- otherwise, these two half-cycles are stored in the buffer memories;
- to convert a cycle into a deterioration value:
- an average of extreme points constituting a counted cycle are calculated,
- a difference of extreme points constituting the cycle is calculated,
  - a memory containing a pre-defined faulty-cycle matrix is read at the intersection of the middle of the cycle, wherein their addresses represent the lines of the memory and the differences between the extreme points of the cycle, wherein their addresses represent the columns of the memory, the total number of cycles of this type leading to failure is read and from which the deterioration value of the cycle is deduced;

an optimistic length of consumed life of the system is calculated by adding up only the deterioration values of the counted cycles, a pessimistic length of consumed life of the system is calculated by adding up, in one part the deterioration values of the counted cycles, and, in another part the deterioration values of the remaining half-cycles.

BRIEF DESCRIPTION OF THE DRAWINGS

The invention will be more easily understood when reading the following description and studying the accompanying drawings. These are presented as an indication and are not limitative to the invention:

FIG. 1 shows a schematic representation of an automatic measuring device equipped with the perfected means of the invention;

FIG. 2 shows an illustration of the steps, in one embodiment, of the method according to the invention;

FIGS. 6a and 6b show in graph form a first case of cycle counting from simplified data, according to one embodiment of the invention;

FIGS. 7a and 7b show in graph form a second case of cycle counting from simplified data, according to one embodiment of the invention, FIG. 8 shows a memory with parameters of difference in temperature and average temperature of heat cycles.

DETAILED DESCRIPTION

Figure 3:
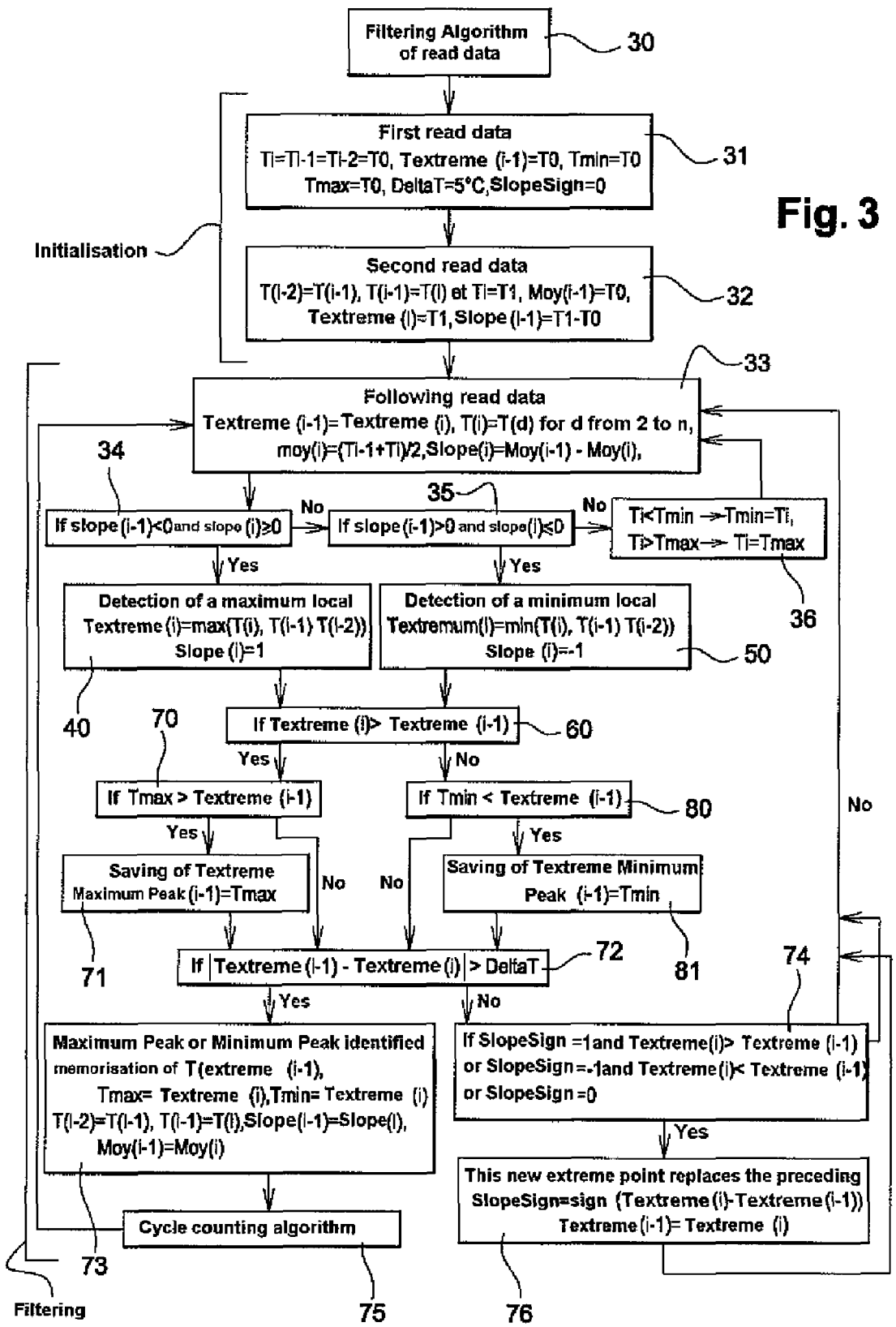
FIG. 3 shows an illustration of the steps, in one embodiment, of the filtering of measured data, according to the invention.

FIG. 1 shows a schematic representation of a device 1 for monitoring in real time, installed in a system 2 to be monitored. The device 1 provides onboard intelligence for running a health check on the system 2.

In the embodiment depicted in FIG. 1, and in the rest of the description, the system to be monitored is an electronics card installed on board an airplane. In the invention, the monitoring device 1 instantly measures and analyzes an environmental parameter of the system 2. In the embodiment depicted in FIG. 1, the measured and analyzed environmental parameter is a temperature of the system 2. The device 1 thus monitors the heat cycles to which the electronics card is subjected. Of course, other types of environmental parameters, such as in particular humidity, pressure and shock can be measured.

The device 1 is often made in the form of an integrated circuit. It comprises a processing unit. This processing unit comprises a microprocessor 3 and a program memory 4. The microprocessor 3 is linked to the program memory 4, to a data memory 5, to a screen 6, to two push buttons 7a and 7b, to at least one sensor 8, to a memory containing the faulty-cycle matrix M, and to entry and exit interfaces 9 and 10, through a communication bus 11.

In one embodiment, the processing unit is installed in the system without being integrated into the device, as is the case in FIG. 1. The data memory 5 comprises in one embodiment, three rotary buffer memories 5a, 5b, 5d. These buffer memories 5a, 5b, 5d are described further below.

The device 1 is powered by an autonomous battery, not shown. This battery is preferably rechargeable. When the battery needs to be changed, before the destruction of the system 2 to be monitored, the data concerning the length of consumed life can be kept in a non volatile memory.

The screen 6 of the device 1 is in one embodiment composed of two display 7 segments. The two display 7 segments have 7 segments and a decimal point. The segments, or the points being used to represent alphanumeric symbols of the displays, may be light-emitting diodes.

The two push buttons 7a and 7b are protruding parts on which pressure is put to start up a display of the percentage of length of consumed life of the system 2 on the screen 6. The push button 7a permits the display of a pessimistic percentage of system life, when it is pushed. The push button 7b permits the display of an optimistic percentage of system life, when it is pushed. In one embodiment, the device can comprise a single push button, and through successive pushes, it is possible to obtain either the optimistic percentage or the pessimistic percentage of the system life 2, or to stop the display in order to reduce energy consumption.

The device 1 sends through the exit interface 10, the measuring order to the sensor 8. It receives through the entry interface 9 the measurement taken by the sensor 8. The sensor 8 measures a physical value 8b of an environmental parameter 8a. It transmits this measurement to the microprocessor 3 in the form of electrical signals through a serial bus B. The sensor 8 is, in the embodiment depicted in FIG. 1, a temperature sensor. It thus measures a temperature 8a measurement or value 8b.

The temperature sensor 8 can be replaced by other types of existing sensors. According to different embodiments of the invention, the device 1 can comprise as many sensors 8 as is necessary to the implementation of the application. The temperature sensor 8 can be situated on the system 2 to be monitored.

In practice, when the device 1 is requested to perform an action, this is done by the microprocessor 3 of the device 1 commanded by instruction codes recorded in the program memory 4 of the device 1.

The program memory 4 is divided into several zones, each zone corresponding to instruction codes for performing a function of the device 1. The memory 4 comprises a zone 12 comprising instruction codes for acquiring measurements taken by the sensor 8. The memory 4 comprises a zone 13 comprising instruction codes for applying, to each acquired measurement, the data-simplification algorithms in order to determine the extreme points. The memory 4 comprises a zone 14 comprising instruction codes for applying to each determined extreme point the cycle-counting algorithm in order to determine the heat cycles to which the system 2 is subjected. The memory 4 comprises a zone 15 comprising instruction codes for applying the length of consumed life calculation algorithm of the system 2 from the determined cycles.

This zone 15 for deterioration calculation converts each determined cycle into a deterioration value equal to the opposite of the number of faulty cycles as is given in FIG. 8, using the memory containing the faulty cycle matrix M. It calculates a total 15a of these deterioration values. This total 15a is transmitted by the device 1 to a first entry of a comparator 15b. This comparator 15b receives at a second entry a predefined threshold 15c of maximum deterioration of the system 2. Once the total 15a of deterioration values is greater than the threshold 15c, the device will launch a warning, thus permitting the optimization of the system. This warning may be the start up of an audio alarm 15d, and/or the start up of a visual alarm 15e and/or the transmission of a message to an operator 15f. The sending of this message can be done using a wireless communication protocol, such as the UMTS standard, the GSM standard GSM, etc.

The memory 4 comprises a zone 16 comprising instruction codes for displaying on the screen 6, a percentage of length of consumed life of the system, according to the push buttons 7a and 7b.

FIG. 2 shows an illustration of the operating steps of the means illustrated in FIG. 1, according to the invention. For the remainder of the description, the environmental parameter described is the temperature, on the understanding that this could be replaced by other types of existing environmental parameters.

FIG. 2 shows a preliminary step 20, in which, the measured values, or measurements, supplied by the sensor 8 are transmitted to the device 1. For each transmitted measurement, the device applies the steps 21 to 26. The processing mode of the invention is such that the transmitted measurements are processed immediately after their transmission. Also, the waiting time which separates the entry of the transmitted measurements from the results is reduced to a minimum.

In stage 21, the device applies the simplification algorithm to each measurement transmitted by the sensor 8 to the device 1. As will be described with reference to FIG. 3, the simplification algorithm implements technical or other means with regards to detecting the extreme points. This algorithm is a method of filtering which consists of absorbing the measurements which do not represent an extreme point.

In one embodiment, the algorithm searches for an extreme point for each of the three latest transmitted measurements. The extreme point is a maximum or a minimum. Thus the data-simplification algorithm makes it possible to obtain a simplified profile of the transmitted measurements. This simplified profile is constituted of successive minimum and maximum peaks. This simplified profile can be obtained through use of a low-pass filter with a predefined filtering threshold. The device considers that two consecutive extreme points form a half-cycle.

The simplification algorithm makes it possible to reduce the number of transmitted measurements to which the life span calculation algorithm is applied. With this algorithm, only pertinent information is retained.

In one variation, the recording function of a TMSD recording device can be used, if necessary, by recording the evolution of the environment in parallel with the application of the invention's algorithms. In this case, the TMSD device only records the simplified profile of the parameter measurements, thus considerably reducing the time required by the processing unit to provide results.

In step 22, the device applies the cycle-counting algorithm to each detected extreme point. A cycle is the group of states or values through which, in a defined order which can be repeated, a measurement value of the system passes. In the invention, a cycle is determined by pre-defined rules. Using these rules, the device is able to determine when two half-cycles form a cycle, as is shown by FIGS. 6a and 7a. With the invention, the cycle-counting algorithm needs few memory resources for optimal and real time operation.

In step 23, the device applies the length of consumed life calculation algorithm to the system to be monitored. The estimation of this life span is made using a faulty-cycle matrix, which is obtained through simulation, and stored in memory. For each determined cycle, the device determines, according to the faulty-cycle matrix stored in memory, a deterioration value. This step 23 will be described below with respect to FIG. 8.

In step 24, when the sum of deterioration values is worth at most t, the card, or other monitored system, is faulty. It is obvious that the indications given by the calculations of deterioration in memory are to be considered in respect of an order of size, and that, as a consequence, the maintenance of the monitored system should be done before the estimation of the fractional length of consumed life given by the device has reached the value of 1.

In the invention, the memory containing a faulty-cycle matrix is integrated dynamically in the device, in one embodiment, during configuration. Thus, according to the environmental parameter of the system to be monitored, a series of simulations of this system is carried out in order to form a deterioration memory. The parameters of this memory, in one example, are a difference in temperature and an average temperature of heat cycles, as is depicted in FIG. 8.

In step 25, the push button 7b is pushed and the result of the life span calculation is displayed on the screen in the form of a percentage. This result takes into account only the identified whole cycles and generates an optimistic result on the state of health of the system to be monitored.

In step 26, the push button 7a is pushed and the result of the life span calculation is displayed on the screen in the form of a percentage. This result takes into account the identified whole cycles as well as the remaining half-cycles and generates a pessimistic result on the state of health of the monitored system. This result is pessimistic since it is greater than the real rate of deterioration of the system to be monitored.

FIG. 3 shows a preliminary step 30 in which the device applies the simplification algorithm of the temperature measure taken by the sensor. This simplification algorithm is applied to each new temperature measurement or data, by including the two preceding measurements, as well as the latest measurement identified as an extreme point. This extreme point is a maximum or a minimum.

In step 31, the device initializes the temperature measurements used by the simplification algorithm. These temperature measurements are in particular:
 the two preceding temperature measurements $T(i-1)$ and $T(i-2)$,
 the latest temperature measurements $T(i)$,
 the last identified temperature measurement being an extreme point $Text(i-1)$, and
  the Tmin minimum and Tmax maximum temperatures between two consecutive extreme points.

The simplification algorithm also comprises a parameter representing a slope sign SlopeSign between the two last identified extreme points.

During initialization, the device defines a Delta T threshold. In the example in FIG. 3, this Delta T threshold is in the order of 5 degrees Celsius. The device acquires a first temperature measurement data T0, thus the parameter $T(i)$ receives the measure T0. The temperature measurements are initialized with the measurement T0. And, the SlopeSign parameter is nil.

In step 32, the device acquires a second temperature measurement data T1. In this case, the parameter $T(i)$ receives the temperature measurement T1. The device defines a parameter representing the previously calculated average $Av(i-1)$ as being equal to T0. The device defines the temperature of an extreme point Text(i) as being a T1. It also calculates a slope S(i−1) corresponding herein to the difference in temperatures T1 and T0.

Step 31 and step 32 constitute the initialization stage of the simplification algorithm of temperature measurements. The device can, after this initialization stage, apply to each newly acquired measurement, the following steps of filtering the measurements.

In step 33, the device acquires a new temperature measurement T(i). It calculates the average Av(i) at that moment i. The temperature averages are calculated two by two and are used in order to determine the slopes permitting the detection of extreme points amongst the three last temperatures. The average at that moment i is Av(i)=[T(i−1)+T(i)]/2. The device can now determine the slope S(i) This slope S(i) corresponds to the difference in the previously calculated average temperature at that moment i−1 and the last calculated average temperature, at that moment i. Thus S(i)=Av(i−1)−Av(i). After having obtained these data, the device can then determine an extreme point for the last three acquired measurements.

In step 34, the device determines the sign of the slope S(i−1) previously calculated and the last calculated slope S(i). When the previously obtained slope S(i−1) is negative and the last obtained slope S(i) is greater than or equal to zero, then the device applies steps 40, 60 and 70 to 76, otherwise it applies step 35.

In step 35, when the previously obtained slope S(i−1) is positive and the last obtained slope S(i) is less than or equal to zero, the device applies steps 50, 60, 80, 81 and 72 to 76, otherwise it applies step 36.

In step 36, the device reinitializes the minimum temperature Tmin parameters, the maximum temperature Tmax parameters and those of the last acquired temperature T(i). When the value of the parameter T(i) is lower than the value of the Tmin parameter then the Tmin value is replaced by the value of T(i). And, when the value of the parameter T(i) is higher than the value of the Tmax parameter then the value of T(i) is replaced by the value of Tmax. The device returns to step 33. It acquires a new measurement and restarts operations.

In step 40, the device has detected an extreme point. This extreme point is a maximum. In this case, the parameter of the extreme point temperature Text(i) receives the maximum amongst the last three acquired temperature measurements T(i), T(i−1), T(i−2). The parameter of the last slope S(i) receives the value 1.

In step 60, when the last parameter of the extreme point temperature Text(i) identified is greater than the parameter of the previously identified extreme point temperature Text(i−1), then the device applies step 70, otherwise it applies step 80.

In step 70, when the parameter of the maximum temperature Tmax is greater than the parameter of the previously identified extreme point temperature Text(i−1), then the device applies step 71, otherwise it applies step 72.

In step 71, the device saves the maximum detected temperature. The parameter of the previously identified extreme point temperature Text(i−1) receives the parameter value of the maximum temperature Tmax.

In step 72, when the absolute value of the difference between the parameter of the last identified extreme point temperature Text(i) and the parameter of the previously identified extreme point temperature Text(i−1) is higher than the Delta T threshold value, then the device applies step 73, otherwise it applies step 74.

In step 73, the extreme point is therefore identified and recorded. The device reinitialises the parameter values required for the simplification of parameters. These reinitialized parameters are reinserted into the algorithm in step 33 in order to determine the following extreme points. The identified extreme point is transmitted in step 75 to the cycle-counting algorithm, as will be described with respect to FIGS. 6a and 7a.

In step 74, when the parameter value SlopeSign=1 and the parameter value Text(i) is greater than the parameter value Text(i−1) then the device applies step 76, otherwise it returns to step 33. When the parameter value of SlopeSign=−1 and the parameter value Text(i) is lower than the parameter value Text(i−1), then the device applies step 76, otherwise it applies step 33. And, when the parameter value SlopeSign=0 then the device applies step 76, otherwise it applies step 33.

In step 76, the device reinitialises the parameter value SlopeSign as well as the parameter value Text(i) and returns to step 33.

In step 50, the device has detected an extreme point. This extreme point is a minimum. In this case, the parameter of the extreme point temperature Text(i) receives the minimum amongst the last three acquired temperature measure T(i), T(i−1), T(i−2). The parameter of the last slope S(i) receives the value (−1).

After step 50 the device applies step 60. In step 80, when the minimum temperature Tmin parameter is lower than the previously defined extreme point temperature Text(i−1) parameter, then the device applies step 81, otherwise it applies step 72.

In step 81, the device saves the minimum detected temperature. The parameter of the previously identified extreme point temperature Text(i−1) receives the parameter value of the minimum temperature Tmin. And, after step 81, the device applies step 72.

This simplification algorithm is therefore applied to each new temperature measurement. Average temperatures are calculated two by two and are used in order to determine the slopes permitting the detection of extreme points amongst the three last temperatures.

At each identification of a new extreme point, said extreme point is compared to the lowest or the highest value, according to the extreme point, in order to apply the extreme value to the extreme point.

If the difference in temperature between this new extreme point and the precedent is higher than the minimum Delta T user defined temperature threshold, which is equal herein to 5° C., then this extreme point is recorded to form the simplified profile. In the opposite case, the extreme point is temporarily recorded for comparison with the next identified extreme point.

Figure 4:
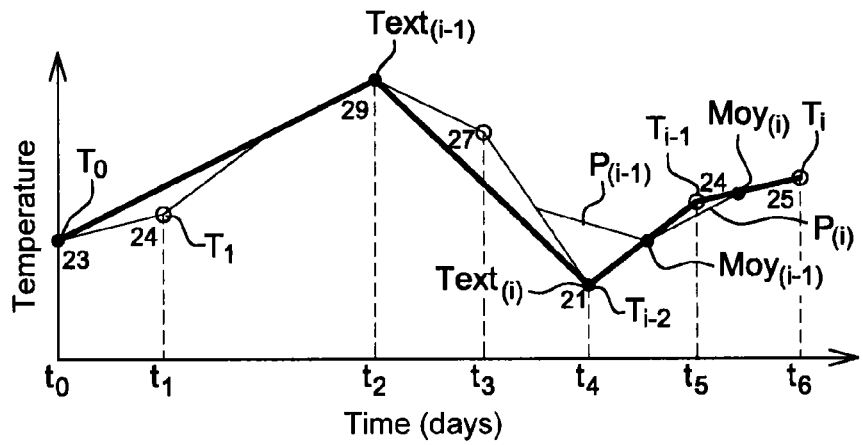
FIG. 4 shows in graph form an implementation of the steps of the method of filtering of FIG. 3, according to the invention'

FIG. 4 explicitly shows the application of the algorithm of FIG. 3. It shows a graph in which the abscissa represents the time in days where the values are measured and the ordinance shows the measure of the temperature in degrees Celsius.

At the moment of t0 and t1, the device initializes the algorithm's temperature parameters. It considers the measured T0 temperature value at the moment t0 as being the first detected extreme point.

The example in FIG. 4 shows the application of the data-simplification algorithm of FIG. 3, to the last 3 acquired measurements. At the moment i, represented by t6, the device acquires a new temperature measure T(i) which is equal to 25 degrees Celsius. The two previously acquired temperatures are T(i−1) 24 degrees Celsius, and the temperature T(i−2)=21 degrees Celsius.

The device calculates the average Av(i) of the two last acquired temperatures. Herein the average temperature Av(i) =24.5 degrees Celsius. The previously calculated average temperature Av(i−1) is equal to 22.5 degrees Celsius.

The device calculates a slope, called preceding, corresponding with the difference between the average of the previous measure and the oldest preceding measure and the average of the two preceding measurements. The device calculates the new slope S(i)=Av(i−1)−Av(i). The new slope S(i) is negative. And, the previously calculated precedent slope S(i−1) is positive.

In this case the device applies steps 50, 60, 80, 81 and 72 to 76 of the algorithm of FIG. 3. It has detected a local minimum and it determines this minimum from amongst the last three transmitted temperature measurements. The extreme point temperature Text (i) parameter receives the value of the lowest temperature amongst these three measurements. In the example in FIG. 4, Text(i)=21 degrees Celsius.

The device determines if the absolute value of the difference between the previously detected extreme point, which is herein Text(i−1)=29 degrees Celsius, and the extreme point Text(i), is higher than 5 degrees Celsius, which is the previously defined Delta T temperature threshold. In the example in FIG. 4, the absolute value of the difference between the two detected extreme points is equal to 8. The extreme point Text(i) is therefore considered as being a minimum peak. This minimum peak can then be transmitted to the cycle-counting algorithm.

Figure 5A:
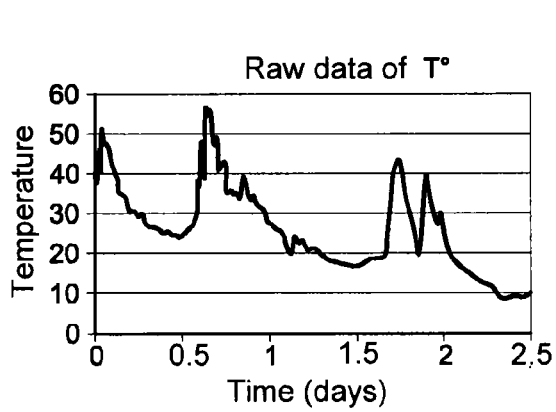
FIG. 5a shows in graph form the appearance of data measured by the sensor.
Figure 5B:
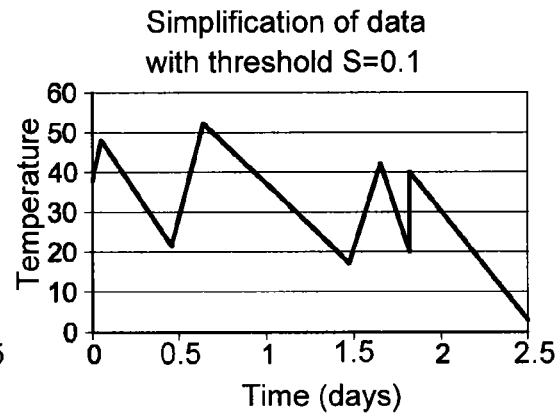
FIG. 5b shows in graph form the appearance of measured and simplified data, according to the state of the art.

FIG. 5*a* shows the unprocessed temperature measurements transmitted to the device before the application of the data-simplification algorithm. These unprocessed measurements are simplified according to an S parameter. This S parameter is a parameter of which the value to be determined is non-trivial. This parameter S is a parameter which is physically non-quantifiable, it is an aggregation parameter. This S parameter is defined retroactively It cannot be applied to transmitted measurements until the profile of recorded measurements is complete. An example of data simplification with this S parameter is shown in FIG. 5*b*. The S parameter set herein at 0.1 corresponds with a Delta T threshold situated between 15 and 20 degrees Celsius.

Figure 5C:
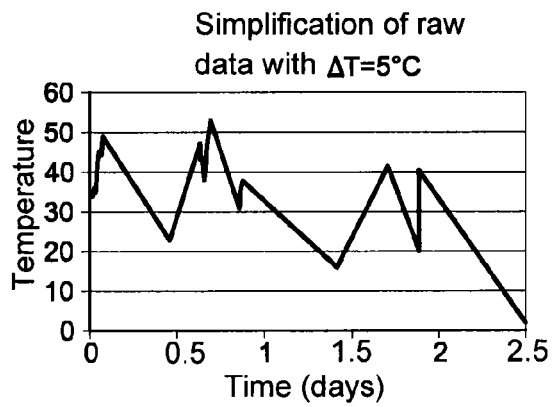
FIGS. 5c and 5d show in graph form the appearance of measured and simplified data, according to one embodiment of the invention, for different thresholds.
Figure 5D:
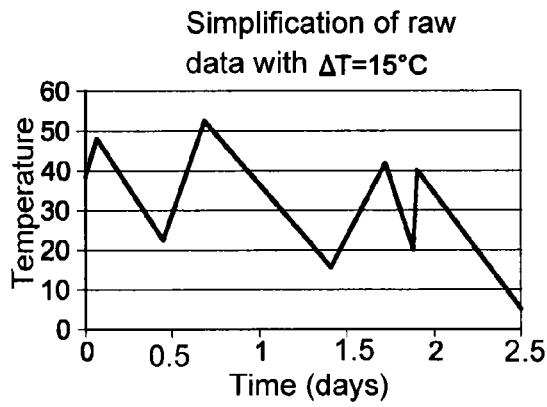

FIGS. 5*c* and 5*d* show, according to different Delta T temperature thresholds, an appearance of simplified measurements. Replacing the S parameter by a physical Delta T parameter facilitates the implementation of the simplification algorithm as well as operator understanding. The operator is thus able with a physical parameter to choose a suitable Delta T threshold according to the type of filtering required. This type of filtering permits the extraction of transmitted measurements, the half-cycles of which the temperature difference is higher than the defined Delta T threshold.

As is shown in FIGS. 5*c* and 5*d*, the higher the Delta T value, the lower the number of detected extreme points. The number of transmitted and simplified measurements diminishes according to the increase in the value of the Delta T threshold. Thus, with a Delta T threshold of 5 degrees Celsius the number of measurements remaining after filtering is much greater than the number of remaining measurements for a Delta T threshold of 15 degrees Celsius.

In one embodiment, the measurements transmitted by the sensor after several days are in the order of 9,546 measurements. In this case, by applying the data-simplification algorithm with a Delta T threshold of 5 degrees Celsius to the transmitted measurements, the number of remaining measurements after filtering is 709 measurements. When the Delta T threshold is 15 degrees Celsius, then the number of remaining measurements after filtering is 350. For the same number of data and an S parameter set at 0.1, the number of remaining measurements after filtering is equal to 333.

FIGS. 6*a* and 6*b* and FIGS. 7*a* and 7*b* show two possible cases of cycle detection by the cycle-counting algorithm. The installed cycle-counting algorithm is applied to each new extreme point identified as being a minimum peak or a maximum peak by the data-simplification algorithm. The detected extreme point constitutes a half-cycle with the precedent minimum or maximum peak.

The cycle-counting algorithm comprises three parameters, in particular a $\Delta T$ temperature-difference parameter between two consecutive extreme points forming the half-cycle, an average temperature of the half-cycle AvT, and a crawling time of the half-cycle tcrawl.

The cycle-counting algorithm is a recursive function. As a consequence, for real time requirements, as well as random access memory size, three rotary buffer memories 5*a*, 5*b* and 5*d*, one per parameter, are used to store the half-cycles, as is depicted in FIG. 1. The buffer memory 5*a* receives the $\Delta T$ temperature-difference parameter, the buffer memory 5*b* receives the average-temperature parameter and the buffer memory 5*c* receives the crawl-time parameter. In one embodiment, these three buffer memories can store up to ten consecutive half-cycles. The size of these memory buffers can be changed according to the application.

Tests carried out on numerous temperature profiles have shown an optimal yield from the cycle-counting algorithm when the buffer memory being used has a depth of ten half-cycles. In effect, no half-cycles were lost when using buffer memories of this type.

To determine, or identify, a cycle, the cycle-counting algorithm needs to verify whether the following two conditions are respected. The first of the conditions is to have at least two half-cycles stored in the buffer memory. The second condition is to have a $\Delta T$ temperature difference of the new cycle higher to that of the preceding half-cycle. The difference of $\Delta T$ temperatures is the absolute value of the difference in the detected extreme point temperatures forming the half-cycle.

When one of these two conditions is not respected, then the device stores the half-cycles in the rotary buffer memories. If this case occurs more than ten consecutive times, then the oldest half-cycle is deleted and replaced by the new one and the different pointers are updated to manage the overflow of storage in the rotary buffer memories.

FIG. 6*a* shows a first possible case of cycle appearance in the detected extreme points. The ordinance in the graph in FIG. 6 represents the extreme point temperatures and the abscissa represents the time in days where the said extreme points were obtained.

FIG. 6*a* shows a first half-cycle D1 formed by the extreme points E1 and E2, a second half-cycle D2 formed by the extreme points E2 and E3 and a third half-cycle D3 formed by the extreme points E3 and E4.

Once two successive half-cycles have been detected in the buffer memory, such as the first half-cycle D1 and the second half-cycle D2, the cycle-counting algorithm verifies the second condition. For each of the half-cycles D1 and D2, it calculates the $\Delta T$ temperature difference. For the first half-cycle D1, the $\Delta T1$ temperature difference=|T2−T1|. For the second half-cycle D2, the $\Delta T2$ temperature difference=|T3−T2|. In the example in FIG. 6*a*, the $\Delta T1$ temperature difference of the first half-cycle D1 is higher than the $\Delta T2$ temperature difference of the second half-cycle D2. Because of this, the second condition is not respected. This requires that the device stores the two half-cycles in the rotary buffer memories.

The cycle-counting algorithm acquires a third half-cycle D3. It calculates the ΔT3 temperature difference=|T4−T3| of said third half-cycle D3. As the first condition is respected, since there are more than two half-cycles stored in the rotary buffer memories, then the algorithm verifies the second condition. In the example in FIG. 6a, the difference in ΔT2 temperature of the second half-cycle D2 is lower than the difference in ΔT3 temperature of the third half-cycle D3. In this case, the second condition is respected. Because of this, the second half-cycle D2 is counted as being a cycle.

In this case, the extreme points E2 and E3 of the second half-cycle are deleted, as is shown in FIG. 6b, and the extreme points E1 and E4 are joined up. And, for each new extreme point produced, the cycle-counting algorithm applies the previously described operations.

FIG. 7a shows a second possible case of cycle appearance in the detected extreme points. The cycle-counting algorithm applies the same conditions for determining cycles as in the example in FIG. 6a. As with FIG. 6a, the algorithm counts the half-cycle D2 as being a cycle.

In general, the principle of counting a cycle, as shown in FIGS. 6a and 7a, uses the four successive extreme points E1, E2. E3 and E4 detected by the data-simplification algorithm. The device determines the three half-cycles D1, D2 and D3 respectively formed by the extreme points E1 and E2, E2 and E3 and E3 and E4. It calculates successively for each half-cycle D1, D2 and D3 respectively, a ΔT1, ΔT2 and ΔT3 temperature difference.

When ΔT2≦ΔT1 and ΔT2≦ΔT3, or in other words when the ΔT2 temperature difference is less than or equal to the two ΔT1 and ΔT3 temperature differences, then the device has detected the presence of a cycle. The cycle represented by the extreme points E2 and E3 is counted by the cycle-counting algorithm and sent to the deterioration-calculation algorithm for processing. The extreme points E2 and E3 are eliminated. And, the two extreme points E1 and E4 situated on each side of the eliminated cycle are joined up. Otherwise, the device shifts by one unit the row of considered extreme points and again applies the precedent test. This procedure is renewed right up to the latest detected extreme point. Once this operation is completed, the remaining half-cycles constitute the remnant.

FIGS. 6b and 7b respectively show the joining up of the extreme points E1 and E4, of FIGS. 6a and 7a.

Once the algorithm has counted a cycle, the device transmits this cycle to the deterioration-calculation algorithm. This algorithm converts a cycle into a deterioration value of the system. This algorithm is designed for estimating the length of consumed life of the system to be monitored. To implement this algorithm, the device comprises a memory containing a faulty-cycle matrix which is, preferably, dynamically integrated in the device, during the previous configuration of monitoring.

For determining this memory containing the faulty-cycle matrix, in one embodiment, it is considered that each heat cycle causes a deformation on the system to be monitored as well as on the components and the weldings of the system. Because of this, at the end of a certain number of heat cycles, mechanically, the operability of the system is destroyed. This destruction is thus linked to the difference in temperature of the cycle, to the nature of the materials, to the welding, and so on. As a consequence, the memory containing the faulty-cycle matrix takes into account all the above-mentioned elements of the system to be monitored when it is implemented. It is obtained by simulation results or by experimental results. All memory containing the faulty-cycle matrix is specific to each system to be monitored. This memory containing the faulty cycle matrix is a non-volatile memory.

An example of memory containing the faulty-cycle matrix is shown in FIG. 8. This preconfigured memory is a rectangular table of values 100, placed in horizontal lines 101 and in vertical columns 102, wherein the addresses of lines 101 represent average values of a cycle, and wherein the addresses of column 102 represent differences of values forming the cycle. The intersection of lines 101 and columns 102 supply a number 103 of faulty cycles.

In the embodiment depicted in FIG. 8, the memory containing the faulty-cycle matrix comprises 11 columns 102 and 11 lines 101. This memory containing the faulty-cycle matrix has parameters for the ΔT temperature difference of the cycle and the average temperature AvT of the cycle.

The crawl-time parameter has been deliberately excluded from the determination in the memory containing the faulty-cycle matrix, because this is the parameter which possesses the lowest impact with regards to the two others on the number of faulty cycles of the card, or system to be monitored.

Thus, when a cycle is determined or identified, the simulation result corresponding to the temperature difference and the nearest average temperature from those of the cycle is used. The length of consumed life is therefore calculated at each new cycle or remaining half-cycle using the relationship:

Length of consumed life (in %)=
=

The calculation of the length of consumed life can be based on the number of life cycles or on the deterioration and makes it also possible to integrate the results of simulations by finished elements, analysis or experimental tests.

However, the cycle-counting algorithm generates the loss of some half-cycles, whereas the deterioration calculation is done according to simulations of which the results give a number of whole cycles. Thus, in order that the estimation of deterioration has a physical sense, only the whole cycles should be used. The result of the consumed life calculation of a system monitored by the device is therefore optimized in this case.

To frame the real result, a second calculation is also carried out by integrating the remaining half-cycles into the first calculation. The length of life used by one of these half-cycles is considered as being one which is generated by a whole cycle, which generates a deterioration which is greater than the real deterioration for each of them.

The estimation of length of consumed life is thus bounded by these two results, pessimistic and optimistic, which can be displayed one after another through the use of the device's push buttons For example, for a cycle with a difference in ΔT temperature equal to 30 degrees Celsius and an average temperature of −30 degrees Celsius, the calculation algorithm determines, in the memory containing the faulty-cycle matrix of FIG. 8, the deterioration value of this cycle. This deterioration value is obtained by calculating the opposite of the number of faulty cycles 103 contained in the memory, at the intersection of these two parameters. It is herein equal to 1/65,535. It takes therefore 65,535 cycles to destroy the system to be monitored. The percentage of deterioration of this cycle is 100×(1/65, 535) %. The device increments this percentage in the length of consumed life of the system. And, when the length of consumed life is equal to 100%, the system is destroyed.

In the description, the estimation of the length of consumed life of the system representing an electronics card has been restricted to the monitoring of heat cycles occurring in the reliability calculation of welded joints. It is obvious that other modes of failure can interfere with the reliability of a card. The algorithms used in the invention herein are generic and are applicable to other physical parameters or measurements. They only need simulation results which are directly useable by the device after the configuration phase.

The advantage of the invention is to herein use the physical nature of the failure in order to obtain a reliability result rather than to be based on statistical results of component reliability which require a long period of experimental results The algorithms integrated into the device have made it possible to carry out predictive maintenance by the displaying, in real time, of the state of health of the electronics cards under surveillance.

In one variation, the environmental parameter sensor can be a strain gauge which can supply the device with data on the deformation of a structure subjected to strain, for example, the wing of an airplane. In accordance with the maximum admissible movement profile and the maximum admissible strain profile, the simulation results define a memory containing the faulty-cycle matrix. The algorithms of the invention permit the calculation of structural fatigue, in real time. Thus, in drastic weather conditions and when the structure of the airplane wing has suffered damage, this is automatically detected.

In one variation, the environmental parameter sensor can be a strain gauge which can supply the device with data on the deformation of a structure subjected to strain, for example, the wing of an airplane. In accordance with the maximum admissible energies distributed in the frequency range of the vibratory profile and the maximum admissible strain profile, the simulation results define a memory containing the faulty-cycle matrix. The invention's algorithms permit the calculation of structural fatigue, in real time In another embodiment, the device may comprise both a strain gauge and a temperature sensor.

The invention claimed is:

1. A device for monitoring one or more values of an environmental parameter of an environment surrounding a system, the device comprising:
    a sensor to measure said values;
    a circuit for transmitting said values;
    a processing unit comprising a microprocessor and a program memory for receiving said values, and processing said values in order to determine a percentage of consumed life of the system, the percentage of consumed life being the result of the environment to which the system is subjected;
    a means for transmission, in real time, of said values to the processing unit;
    wherein the processing unit further comprises:
    a means for simplifying the transmitted values to provide simplified values,
        a means for determining cycles based on the simplified values to provide determined cycles, and
        a means for calculating, in real time, the percentage of consumed life of a system, from the determined cycles, the means for calculating comprising:
        a preconfigured memory comprising a faulty cycle matrix for converting the determined cycles into a deterioration value from the number of faulty cycles contained in said faulty cycle matrix, the preconfigured memory composed of lines wherein addresses of the lines represent average values of the cycle and columns wherein addresses of the columns represent differences in extreme values forming the cycle, the intersection of the lines and the columns supplying a number of faulty cycles, convertible to deterioration values of the cycle, which is opposite to the number of faulty cycles,
        a means for adding up deterioration values to provide a total, and
        a means for at least one of warning, interpreting, or alarming, according to the total.

2. A device according to claim 1, wherein the means for simplification comprise the means for filtering the transmitted values in order to detect the extreme points.

3. A device according to claim 1, wherein the processing unit comprises three buffer memories.

4. A device according claim 1, wherein the sensor is a temperature sensor.

5. A device according claim 1, wherein the sensor is an accelerometer.

6. A device according to claim 1, wherein the sensor is a strain gauge.

7. A device according to claim 1, further comprising a means for displaying making it possible to visualise on a screen a sum of deterioration values.

8. A method of operation of a device for monitoring one or more values of an environmental parameter of an environment surrounding a system, the method comprising:
    measuring said values, said values having maximum and minimum extreme points;
    transmitting said values to a processing unit;
    processing said transmitted values in order to determine a percentage of consumed life of the system, the percentage of consumed life being the result of the surrounding conditions to which the system is subjected, comprising—
    transmitting said values in real time to the processing unit;
    detecting only the temporarily local maximum or minimum extreme points from amongst the transmitted values, including—
        acquiring a new value;
        considering two preceding acquired values prior to the new value, as well as one previously identified value, being an extreme point;
        calculating an average, called a previous average, of the two preceding acquired values;
        calculating an average, called a new average, of the new value and the value immediately preceding the new value;
        calculating a slope, called a preceding slope, corresponding with the difference between the average of value immediately preceding the new value and an oldest preceding value and the average of the two preceding acquired values;
        calculating a slope, called a new slope, corresponding with the difference in the previous average and the new average;
        producing a maximum extreme point, when the sign of the preceding slope is negative and the sign of the new slope is positive, otherwise, producing a minimum extreme point;
        validating the produced extreme point, when the difference between the produced extreme point and the preceding extreme point is greater than a given value of the environmental value to be monitored, otherwise, temporarily recording the produced extreme point to serve as a previous extreme point in a comparison with a next extreme point;

detecting a cycle for each local extreme point thus detected, a cycle being formed by a succession of measures from a minimum to a maximum or the reverse;

converting each detected cycle into a deterioration value;

summing the deterioration values to determine the percentage of consumed life of the system.

9. A method according to claim 8, further comprising:

defining a half-cycle to be formed by two consecutive validated extreme points;

deleting said counted cycle from the half-cycles when at least two half-cycles are stored in buffer memories, and the difference between the extreme points constituting a latest half-cycle is greater than the difference between the extreme points constituting a precedent half-cycle, thus the precedent half-cycle is counted as being a cycle; otherwise, storing said two half-cycles in the buffer memories.

10. A method according to claim 8, further comprising a step to convert a cycle into a deterioration value including:

calculating an average of extreme points constituting a counted cycle;

calculating a difference of extreme points constituting the cycle; and reading, at the intersection of the middle of the cycle, a memory containing a pre-defined faulty cycle matrix, wherein addresses of the matrix represent the lines of the memory and the difference between the extreme points of the cycle, and wherein the addresses of the matrix represent the columns of the memory, the number of faulty cycles from which the deterioration value of the cycle is deduced by inversion.

11. A method according claim 8, further comprising:

calculating an optimistic percentage of consumed life of the system by adding up only the deterioration values of the counted cycles;

calculating a pessimistic percentage of consumed life of the system is by adding up, in one part the deterioration values of the counted cycles, and, in another part the deterioration values of the remaining half-cycles.

\* \* \* \* \*